Figure 1:
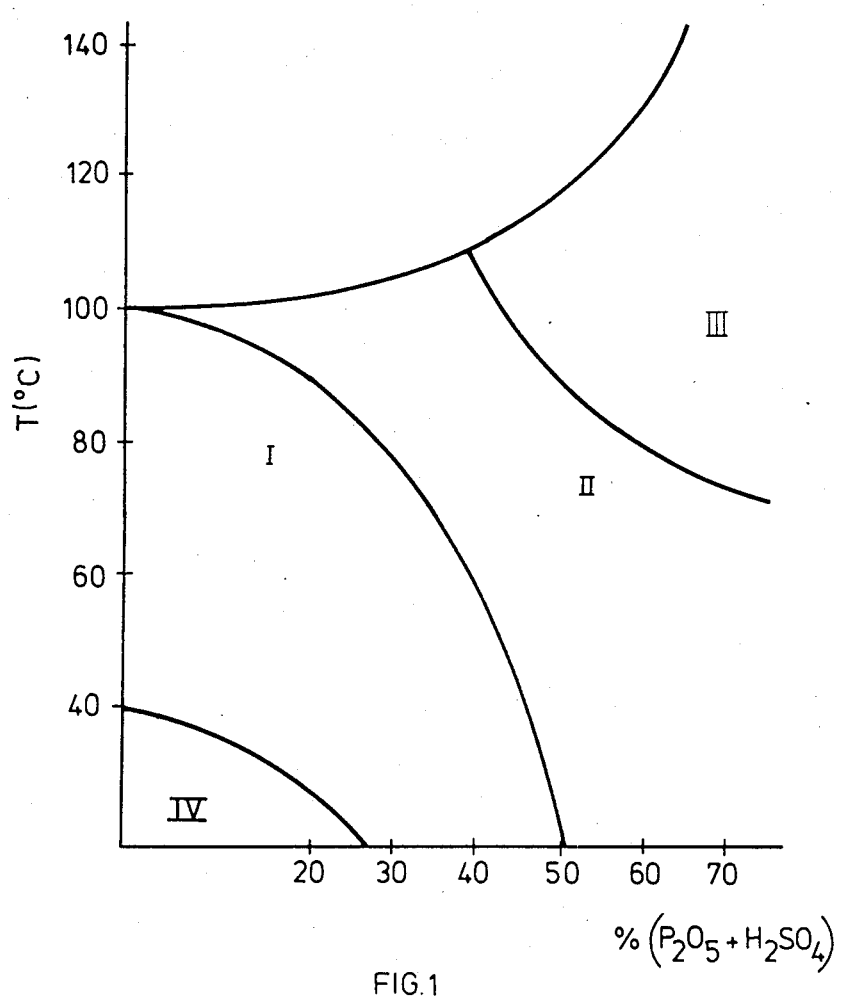

United States Patent [19]

Weterings et al.

[11] Patent Number: 4,822,582

[45] Date of Patent: Apr. 18, 1989

[54] PROCESS FOR THE REMOVAL OF HEAVY METALS FROM ACID, PHOSPHATE-CONTAINING, AQUEOUS MEDIA

[75] Inventors: Cornelis A. M. Weterings, Stein; Johannes A. Janssen, Schinveld, both of Netherlands

[73] Assignee: Stamicarbon B.V., Netherlands

[21] Appl. No.: 69,512

[22] Filed: Jul. 2, 1987

[30] Foreign Application Priority Data

Jul. 15, 1986 [NL] Netherlands .......................... 8601846

[51] Int. Cl.$^4$ .............................................. C01B 25/16
[52] U.S. Cl. ................................ 423/321 R; 423/319; 423/320; 423/555
[58] Field of Search .................... 423/166, 319, 321 R, 423/555, 320

[56] References Cited

U.S. PATENT DOCUMENTS

| | | | |
|---|---|---|---|
| 1,601,208 | 9/1926 | Gerber | 423/321 R |
| 2,081,351 | 5/1937 | Booth et al. | 423/321 |
| 3,949,047 | 4/1976 | Cherdron et al. | 423/321 |
| 4,388,292 | 6/1983 | Palmer et al. | 423/321 |

FOREIGN PATENT DOCUMENTS

| | | |
|---|---|---|
| 8002418 | 1/1980 | PCT Int'l Appl. . |
| 2082558 | 3/1982 | United Kingdom . |

OTHER PUBLICATIONS

Chemical Abstracts No. 52906K, vol. 104, No. 8, Feb. 1986, p. 123.

*Primary Examiner*—Gregory A. Heller
*Attorney, Agent, or Firm*—Cushman, Darby & Cushman

[57] ABSTRACT

A process for the removal of heavy metals from an acid phosphate containing, liquid medium in which process a precipitate containing heavy metals is formed and is subsequently separated and wherein at least one of the two additives (a) sulphate ions and (b) calcium ions is added to the phosphate-containing, liquid medium under such conditions that a calcium sulphate anhydride-containing precipitate is formed.

8 Claims, 1 Drawing Sheet

PROCESS FOR THE REMOVAL OF HEAVY METALS FROM ACID, PHOSPHATE-CONTAINING, AQUEOUS MEDIA

The invention relates to a process for the removal of heavy metals from an acid, phosphate-containing, liquid medium, in which process a precipitate containing heavy metals is formed and is subsequently separated.

Various general techniques are known for the removal of heavy metals such as cadmium from an acid, phosphate-containing, liquid medium.

From DE-A-3327394, for instance, it is known to remove heavy metals from acid, phosphate-containing, liquid media using liquid-liquid extraction.

Problems encountered in such processes are emulsification and the difficulty of achieving phase separation. In addition, as extractants use is mostly made of rather expensive sulphur compounds that are foreign to the process and are unstable in the given acid, phosphate-containing environment.

Another method for removing heavy metals from acid, phosphate-containing, aqueous media is described, for instance, in WO 8002418. This method relates to the separation of heavy metals in a solid using sulphur compounds that are added to the phosphate-containing medium after the phosphate-containing medium has at least in part been neutralized.

Disadvantages of these methods are that the sulphur compounds used for the removal of heavy metals are foreign to the process and that the acid medium must first at least in part be neutralized before removal of the heavy metals takes place. In addition, it is very difficult to separate the cadmium-containing solid in these processes.

The invention provides a process for the removal of heavy metals from acid, phosphate-containing media in which the above problems are eliminated.

According to the invention this is achieved in that at least one of the two additives (a) sulphate ions, and (b) calcium ions is added to the phosphate-containing, liquid medium under such conditions as to yield a precipitate substantially containing calcium sulphate anhydrite.

It has, surprisingly, been found that calcium sulphate anhydrite has great affinity for heavy metals, as a result of which high concentrations of heavy metals can be incorporated in calcium sulphate anhydrite. Cadmium concentrations of up to 2000 ppm have, for instance, been found in calcium sulphate anhydrite. This way, therefore, it is possible to remove heavy metals from a phosphoric acid medium without adding substances that are foreign to the process and without prior neutralization, while still obtaining only a limited amount of waste product containing heavy metals.

Besides heavy metals, also other elements that are incorporated in calcium sulphate anhydrite can be separated in this way.

The subject process can in principle be applied to any acid, phosphate-containing, liquid medium from which heavy metals are to be removed. It is of importance in particular in processes in which phosphate rock is digested with a mineral acid, such as wet phosphoric acid processes and nitrophosphate processes.

The phase diagram of calcium sulphate as a function of the sum of the sulphuric acid and $P_2O_5$ concentrations and the temperature is known for the wet phosphoric acid preparation (see FIG. 1). In FIG. 1 area I represents a stable $CaSO_4$, metastable $CaSO_4 \cdot 2 H_2O$ and unstable $CaSO_4 \cdot 1/2 H_2O$ phase; Area II represents a stable $CaSO_4$, metastable $CaSO_4 \cdot 1/2 H_2O$ and unstable $CaSO_4 \cdot 2 H_2O$ phase; area III represents a stable $CaSO_4$ and unstable $CaSO_4 \cdot 1/2 H_2O$ phase and area IV represents a stable $CaSO_4 \cdot 2 H_2O$ and metastable $CaSO_4$ phase. The formation of calcium sulphate anhydrite is promoted by higher sulphate concentrations, higher $P_2O_5$ concentrations and higher temperatures. In many cases the calcium sulphate will not precipitate directly in the form of calcium sulphate anhydrite, though this is the stable phase. In these cases calcium sulphate anhydrite formation can be promoted by introducing calcium sulphate anhydrite crystals or by using longer residence times. Similar relationships hold for nitrophosphate solutions.

During the precipitation the temperature will generally be between 40° and 110° C., while the sum of the $P_2O_5$ and sulphuric acid concentrations will in general be higher than 50%. Lower concentrations are also used, notably at longer residence times (in excess of half an hour).

The amount of sulphate or calcium ions to be added and the temperature during precipitation are preferably chosen such that conditions are achieved that correspond to area II or III of the phase diagram shown in FIG. 1.

Incorporation of notably cadmium into calcium sulphate anhydrite is dependent on the ratio between cadmium ions and calcium ions in the acid, phosphate-containing, liquid phase. As this ratio increases, the cadmium ions concentration in the calcium sulphate anhydrite formed also increases. The distribution coefficient in equilibrium of cadmium over the crystalline phase and the liquid phase, defined as the cadmium:calcium ratio in the crystalline phase divided by the cadmium:calcium ratio in the liquid phase, is between $0.5 \times 10^{-2}$ and $5 \times 10^{-2}$ in the case of anhydrite formation. Using this value, the amounts of calcium and sulphate to be added can be determined from the starting concentrations of calcium ions and sulphate ions, the cadmium concentration and the amount of cadmium to be removed.

In one embodiment of the process according to the invention heavy metals are removed from the phosphoric acid obtained as product of a wet phosphoric acid process. In this embodiment calcium sulphate hemihydrate or dihydrate is added to the phosphoric acid. By addition of sulphate ions, for instance concentrated sulphuric acid, calcium sulphate hemihydrate or dihydrate is recrystallized to calcium sulphate anhydrite.

As calcium sulphate hemihydrate or dihydrate use can be made of calcium sulphate hemihydrate or dihydrate obtained as by-product in the preparation of the phosphoric acid. If desired, the phosphoric acid can, after removal of the heavy metals, be desulphatized, for instance by addition of extra phosphate rock.

In a second embodiment of the process according to the invention heavy metals are removed from the recycle acid stream of a wet phosphoric acid process in which phosphate rock is digested using a phosphoric acid/sulphuric acid mixture. Upon digestion calcium sulphate hemihydrate is formed, which is subsequently separated. The product acid stream obtained upon separation of this calcium sulphate hemihydrate is in part discharged as product and in part returned to the digestion section as recycle acid. Subsequently, the sulphuric acid required for digestion of the phosphate rock and a small amount of phosphate rock are added to this recycle acid stream, yielding a calcium sulphate anhydrite precipitate.

In such a process such conditions can be chosen during the digestion of the majority of the phosphate rock with a sulphuric acid/phosphoric acid mixture, which yields calcium sulphate hemihydrate, as to result in minimal incorporation of heavy metals in the calcium sulphate hemihydrate. In addition, the conditions in the recycle acid flow can be chosen such that calcium sulphate anhydrite is formed in which the maximum amount of heavy metals is incorporated. As a consequence, the product acid obtained by this process and the calcium sulphate hemihydrate obtained as by-product are virtually free from heavy metals, while the heavy metals originating from the phosphate rock are concentrated in a calcium sulphate anhydrite stream that is small relative to the amount of calcium sulphate hemihydrate obtained.

Choosing the digestion conditions such that a minimal amount of heavy metals is incorporated in the calcium sulphate hemihydrate precipitate generally implies that a large amount of $P_2O_5$ is then incorporated in the precipitate. By preference, therefore, the calcium sulphate hemihydrate or dihydrate formed is recrystallized to calcium sulphate dihydrate or, respectively, hemihydrate so as to recover the $P_2O_5$ incorporated in the precipitate.

The calcium sulphate hemihydrate or dihydrate obtained as by-product, which contains few harmful incorporated contaminants, now is suitable for further application, for instance in the building industry.

According to a third embodiment of the process according to the invention heavy metals are removed from the acid, phosphate-containing, liquid medium obtained in a nitrophosphate process after digestion of phosphate rock with nitric acid, cooling and separation of calcium nitrate crystals. This liquid medium has a relatively high residual calcium ions concentration. In this embodiment of the process according to the invention the liquid medium is heated and sulphate ions are added to yield a mixture containing calcium sulphate anhydrite, which can subsequently be separated. The solution obtained can subsequently be desulphatized, for instance by means of calcium carbonate or rock phosphate. Sulphate ions can be added in the form of sulphuric acid. In nitrophosphate processes the liquid medium formed is subsequently neutralized using ammonia. It is, therefore, preferred to add sulphate ions in the form of ammonium sulphate.

In nitrophosphate processes yielding potassium-containing mixed fertilizers as end product, it is advantageous to add sulphate ions in the form of potassium sulphate.

The invention will now be elucidated with reference to the examples, without being limited thereto.

EXAMPLE I

From a phosphoric acid stream from a wet hemihydrate phosphoric acid process of 90° C., 44% $P_2O_5$, 1% $H_2SO_4$ with 30 ppm Cd, the Cd was in part removed by recrystallization in this stream, at a residence time of 2 hours, of a portion of the calcium sulphate hemihydrate (HH) precipitated and filtered off at an earlier stage of the phosphoric acid process, yielding calcium sulphate anhydrite (AH). The phosphoric acid:HH mass ratio was 10:1. Concentrated sulphuric acid was added until the $H_2SO_4$ concentration of the recrystallization environment was 8%. The Cd concentration changed from 7.5 ppm in the HH to 280 ppm in the AH. After separation of the AH formed, a phosphoric acid stream with 4.0 ppm Cd remained. Using phosphate rock (52% CaO, 30 ppm Cd), this phosphoric acid stream was desulphatized at 90° C. to 1% $H_2SO_4$, with HH precipitating. After filtering off of this relatively clean HH (1.6 ppm Cd), the phosphoric acid stream contained 6.3 ppm Cd and 44% $P_2O_5$, its volume having increased 6% relative to the outgoing phosphoric acid stream.

EXAMPLE II

Phosphoric acid with 44% $P_2O_5$, 1% $H_2SO_4$ and a strongly reduced Cd content (8 ppm) was obtained in a recycle process in which 16/17th part of the phosphoric acid product stream was returned to the process. To this stream, 5% of the phosphate rock (30 ppm Cd) and the total amount of concentrated sulphuric acid needed for digestion of all phosphate rock were added. At 90° C. and a residence time of 2 hours, AH precipitated with high Cd incorporation (400 ppm). After separation of this AH, a phosphoric acid stream with 8% $H_2SO_4$ remained, in which the remainder of the phosphate rock was digested. Under the prevailing conditions (90° C., 1% $H_2SO_4$), HH with a low cadmium content (2 ppm) precipitated. Of the phosphoric acid obtained after filtering off of this HH, 1/17th part left the process as phosphoric acid product, while the remainder of the phosphoric acid stream was recycled.

EXAMPLE III

Khouribga phosphate rock (16 ppm Cd) was digested using 60% nitric acid, yielding a digestion liquor with 6 ppm Cd. The molar $CaO:P_2O_5$ ratio in the solution was reduced by cooling, crystallization and separation of the calcium nitrate tetrahydrate crystals obtained (0.4 ppm Cd). In this crystallization step, 95-96% of the total amount of cadmium remained behind the liquid phase. The liquid phase, which contained 14 ppm Cd, 8.0% CaO, and 26.0% $P_2O_5$, was heated to a temperature of 50° C. In addition, sulphuric acid (96%) was added until the molar ratio of sulphate ions to calcium ions was 2 (25% $H_2SO_4$). After 2 hours' reaction time, the precipitate was removed, washed with water and acetone, and dried. The purified liquid contained 0.6 ppm Cd and 17% $SO_4$ ions. The precipitate consisted of a mixture of calcium sulphate hemihydrate (55%) and calcium sulphate anhydrite (45%) and contained 54 ppm Cd, corresponding to about 95% of the amount of cadmium originally present in the liquid phase.

EXAMPLE IV

Khouribga phosphate rock was treated in the same way as in Example III. After separation of the calcium nitrate tetrahydrate crystals, sulphuric acid was added until a molar ratio of sulphate ions to calcium ions of approximately 1 (14% $H_2SO_4$) was reached. The precipitate, 90% calcium sulphate hemihydrate and 10% calcium sulphate anhydrite, was further treated as in Example III. Analysis indicated that the Cd concentration of the precipitate was 23 ppm, corresponding to about 46% of the cadmium originally present in the liquid phase. The process liquor obtained contained 7 ppm Cd and 1% $SO_4$ ions.

EXAMPLE V

In the same way as in Example III, Khouribga phosphate rock was digested and the resulting digestion liquor was purified. Calcium carbonate was added to the purified liquor (17% $SO_4$ ions) until the molar ratio of calcium ions to sulphate ions was approximately 1. In this reaction $CO_2$ escaped from the reaction mixture and calcium sulphate precipitated in the form of hemihydrate. After separation of this calcium sulphate hemihydrate, the purified and desulphatized solution contained 1% sulphate ions and 0.8 ppm Cd.

We claim:

1. A process for the removal of heavy metals from an acid, phosphate-containing, liquid medium, in which process a precipitate containing heavy metals is formed and is subsequently separated, which comprises adding at least one of the following additives (a) sulphate ions and (b) calcium ions to the phosphate-containing, liquid medium under such conditions that a calcium sulphate anhydride-containing precipitate containing heavy metals is formed, wherein the amount of calcium or sulphate ions to be added and the temperature during precipitation are chosen such as to result in conditions corresponding to area II or III of FIG. 1.

2. A process according to claim 1, wherein the heavy metals are removed from the phosphoric acid obtained as a product of a wet phosphoric acid process.

3. A process according to claim 1, wherein heavy metals are removed from the acid, phosphate containing, liquid medium obtained in a nitrophosphate process comprising:
   (a) digesting phosphate rock with nitric acid, and (b) crystallizing and separating calcium nitrate tetrahydrate from the digestion liquor, wherein the heavy metals are removed from the solution after separation of the calcium nitrate tetrahydrate crystals.

4. A process for the removal of heavy metals from an acid, phosphate containing liquid medium according to claim 1, wherein the phosphoric acid stream is desulphatized with phosphate rock.

5. A process according to claim 2, wherein the sulphate ions are added in the form of sulphuric acid.

6. A process according to claim 3 wherein the sulphate ions are added in the form of ammonium sulphate.

7. A process according to claim 3 wherein the sulphate ions are added in the form of potassium sulphate.

8. A process for the removal of heavy metals from an acid, phosphate-containing, liquid medium according to claim 5, wherein an amount of and concentration of sulphuric acid causes recrystallization.

* * * * *